United States Patent [19]

Iwasaki

[11] Patent Number: 4,714,490
[45] Date of Patent: Dec. 22, 1987

[54] CONCRETION PREVENTING AGENT FOR FERTILIZERS

[75] Inventor: Tetsuji Iwasaki, Wakayama, Japan

[73] Assignee: Kao Corporation, Tokyo, Japan

[21] Appl. No.: 856,066

[22] Filed: Apr. 23, 1986

[30] Foreign Application Priority Data

May 8, 1985 [JP] Japan .................................. 60-97557

[51] Int. Cl.$^4$ ................................................. C05G 3/00
[52] U.S. Cl. ......................................... 71/27; 71/64.12
[58] Field of Search .................................. 71/64.12, 27

[56] References Cited

U.S. PATENT DOCUMENTS 3,926,841 12/1975 Habasko et al. ................ 71/64.12 X
4,105,430 8/1978 Koch et al. ..................... 71/64.12 X Primary Examiner—Ferris H. Lander
Attorney, Agent, or Firm—Flynn, Thiel, Boutell & Tanis

[57] ABSTRACT

A fertilizer is effectively prevented from concretion and improved in the storage stability with a mixed aldehyde compound of the formula: R—CHO in which R is alkyl or alkenyl having 4 to 30 carbon atoms, optionally having a hydroxyl group.

5 Claims, No Drawings

CONCRETION PREVENTING AGENT FOR FERTILIZERS

The present invention relates to a concretion preventing agent for concretive fertilizers such as, for example, urea, ammonium sulfate, ammonium nitrate, ammonium phosphate, ammonium chloride, potassium chloride, high-grade complex fertilizers and mixed fertilizers thereof.

STATEMENT OF PRIOR ART

Chemical substances used as fertilizers suffer from the defect that they may concrete during the storage and make their operations poor. Therefore, various measures to prevent the concretion have hitherto been investigated and many proposals have been made. The proposed methods to prevent the concretion are roughly classified as follows.

(1) A method which comprises mixing insoluble fine powder such as diatomaceous earth, talc, kaolin, silicic acid powder or a fatty acid calcium salt with a concretive substance, thereby preventing the direct contact of the concretive substance.

(2) A method which comprises coating a concretive substance with mineral oil, water soluble macromolecules or the like to form a waterproofing film, and thereby preventing water from going in and out the concretive substance and preventing the formation of bridging crystals between particles.

(3) A method which comprises spray-treating an aliphatic amine, aliphatic diamine or salt thereof to form a monomolecular film on the surface of a concretive substance, and thereby changing the surface property of the concretive substance and making its concretion difficult.

(4) A method which comprises changing the crystal state by the crystal metamorphism of a complex of macromolecules and an anion surfactant to urea or magentic acid to ammonium sulfate, and thereby preventing the concretion.

(5) A method which comprises adding formalin to fused urea, converting a part of the urea to ureaformalin resin, subsequently performing granulation, and thereby preventing the hygroscopicity and increasing the hardness of granules of the granulated fertilizer.

By this method, the formation of fine powder during the distribution of the fertilizer can be prevented, whereby the fertilizer is prevented from concreting.

However, the above-described methods are not necessarily satisfactory. Namely, by the methods (1) and (2), the satisfactory effect of preventing the concretion may not be obtained even with the addition of several percent of the insoluble fine powder or coating substance. In the case of the method (3), the subjected concretive fertilizers are restricted and, at the same time, it is difficult to coat the fertilizer uniformly with the aliphatic amine. Further, it is difficult to use the fertilizer because of its strong smell of amine and skin irritation.

The method (4) has little effect for high-grade complex fertilizers, though it is efficacious for urea, ammonium sulfate, ammonium nitrate, etc.

Although the method (5) is used for urea, it has little effect of preventing the concretion and has the problem of the toxicity of the formalin.

SUMMARY OF THE INVENTION

Accordingly, the inventors have made intensive studies using various concretive fertilizers in order to obtain an excellent concretion preventing agent free from the above-described drawbacks. As a result, they have completed the present invention.

Namely, the present invention provides a concretion preventing agent for fertilizers, which comprising a compound of the general formula $$R-CHO \qquad (1)$$

wherein R denotes a straight-chain or branched-chain alkyl group or alkenyl group which may contain a hydroxyl group having 4 to 30 carbon atoms.

The invention further provides a method for preventing a fertilizer from concretion by mixing it with a compound of the above shown formula (1) in which R is an alkyl, an alkenyl, a hydroxy-having alkyl or a hydroxy-having alkenyl, having 4 to 30 carbon atoms, being either straight or branched.

It is preferable that R in the formula (1) has 7 to 30 carbon atoms.

The invention moreover relates to a fertilizer composition which comprises a fertilizer and 0.005 to 1.0 percent by weight of the compound as defined above.

In the compound of the general formula (1) according to the invention, the carbon number of the alkyl group or alkenyl group has a critical meaning. Namely, the satisfactory effect of preventing the concretion can not be obtained with an aldehyde containing an alkyl group or alkenyl group of carbon number 3 and below. Only with the carbon number 4 or more, the satisfactory effect of preventing the concretion can be obtained. Aldehyde containing the alkyl group or alkenyl group of carbon number 7 or more is especially preferable. Examples of the preferable aldehyde include octanal, nonanal, 4-hydroxy nonanal, decanal, undecanal, dodecanal, tridecanal, tetradecanal, pentadecanal, hexadecenal, hexadesenal, 7,11-dihydroxy hexadecanal, isohexadecanal, octadecanal, etc.

Fertilizers to which the concretion preventing agent of this invention is applied are not specially restricted. The excellent effect of preventing the concretion can be obtained for any of urea, ammonium sulfate, ammonium nitrate, potassium chloride, ammonium phosphate, high-grade complex fertilizers and appropriately mixed fertilizers thereof.

The concretion preventing agent of the present invention is sprayed into fertilizers intact or after dilution with machine oil or the like. It may be added to the fertilizers in the fused state before granulation to show a more excellent effect of preventing the concretion.

When the concretion preventing agent of the present invention shows the effect of preventing the concretion, the amount of the concretion preventing agent used is more than 0.005% by weight, preferably more than 0.05% by weight, based on the amount of the fertilizer.

Formalin has problems in respect of safety for workers; it is high in toxicity upon contacting or absorbing and shows a carcinogenic character in the case of continual contact over a long period of time. However, it is low in price and, hitherto, no substitute for it has been found.

The compound of the present invention is remarkably improved in safety, since it contains a straight-chain alkyl group or alkenyl group though it has a functional aldehyde group. For example, straight-chain aldehydes of carbon number 8 to 12 are used as the ingredients of perfume and are abundantly contained in leaves of plants. Further, the compound may be used in combination with inorganic substances such as clay, talc, diatomaceous earth, etc. to show a more excellent effect of preventing the concretion.

By using the concretion preventing agent of the present invention, the excellent effect of preventing the concretion can be obtained even for fertilizers of large grain size for which the effect has not been easily obtained up to now.

The present invention will be explained hereinafter by way of examples. However, the invention is not limited to the examples.

EXAMPLE 1

Using urea of large grains (manufactured by Mitsui Toatsu Chemical Industry Co., Ltd., diameter: 3.5 mm) as a fertilizer, 0.1% by weight of the concretion preventing agent of the present invention was sprayed into the urea and then allowed to stand for 30 minutes at a constant temperature of 75° C. or 130° C. After cooling, 45 g of the resultant fertilizer was charged into a cylindrical hard vinyl chloride mold (inside diameter: 4 cm) followed by applying a pressure of 2 Kg/cm$^2$ and allowing to stand for 14 days at 30° C. and a relative humidity of 80%. Thereafter, the fertilizer was taken out of the mold, and its breaking strength was measured using a Tensilon compressive strength gauge. The concretion preventing rate of the fertilizer was determined by the following equation. The results are shown in Table 1.

Concretion preventing rate (%) =

$$\frac{\text{Breaking strength of nonaddition group} - \text{Breaking strength of addition group}}{\text{Breaking strength of nonaddition group}} \times 100$$

EXAMPLE 2

Using a high-grade complex fertilizer (N-P-K, 15-15-15), 0.1% by weight of the same concretion preventing agent of the present invention as in Table 1 was sprayed into the fertilizer and then allowed to stand for 30 minutes at a constant temperature of 75° C. or 130° C. After cooling, 45 g of the resultant fertilizer was charged into a cylindrical hard vinyl chloride mold (inside diameter: 4 cm) followed by applying a pressure of 2 Kg/cm$^2$ and allowing to stand for 14 days at 30° C. and a relative humidity of 80%. Thereafter, the fertilizer was taken out of the mold, and its breaking strength was measured using a Tensilon compressive strength gauge. The concretion preventing rate of the fertilizer was determined by the above-described equation. The results are shown in Table 2.

EXAMPLE 3

Using potassium chloride as a fertilizer, 0.3% by weight of the same concretion preventing agent of the present invention as in Table 1 was sprayed into the potassium chloride. 45 g of the resultant fertilizer was charged into a cylindrical hard vinyl chloride mold (inside diameter: 4 cm) followed by applying a pressure of 2 Kg/cm$^2$ and allowing to stand for 14 days at 30° C. and a relative humidity of 80%. Thereafter, the fertilizer was taken out of the mold, and its breaking strength was measured using a Tensilon compressive strength gauge. The concretion preventing rate of the fertilizer was determined by the above-described equation. The results are shown in Table 3.

TABLE 1

| | No. | Concretion preventing agent | 75° C. Breaking strength (Kg/cm$^2$) | 75° C. Concretion preventing rate (%) | 130° C. Breaking strength (Kg/cm$^2$) | 130° C. Concretion preventing rate (%) |
|---|---|---|---|---|---|---|
| Agent of the invention | 1 | $CH_3(CH_2)_3CHO$ | 4.2 | 57.1 | 3.5 | 61.1 |
| | 2 | $CH_3(CH_2)_6CHO$ | 1.8 | 81.6 | 1.2 | 86.6 |
| | 3 | $CH_3(CH_2)_8CHO$ | 0.9 | 90.8 | 0.7 | 92.2 |
| | 4 | $CH_3(CH_2)_4CH(OH)(CH_2)_2CHO$ | 0.9 | 90.8 | 0.7 | 92.2 |
| | 5 | $CH_3(CH_2)_{14}CHO$ | 0.5 | 94.9 | 0.5 | 94.4 |
| | 6 | $CH_3(CH_2)_2CH=CH(CH_2)_{10}CHO$ | 0.5 | 94.9 | 0.5 | 94.4 |
| | 7 | $CH_3(CH_2)_4CH(OH)-(CH_2)_3-CH(OH)-(CH_2)_5CHO$ | 0.4 | 95.9 | 0.4 | 95.5 |
| | 8 | $CH_3-CH[(CH_2)_4CH_3]-(CH_2)_8CHO$ | 0.5 | 94.9 | 0.4 | 95.5 |
| | 9 | $CH_3-CH(CH_3)-(CH_2)_4-CH[(CH_2)_6CH_3]-(CH_2)_2-CHO$ | 0.7 | 92.8 | 0.6 | 93.3 |
| Comparative agent | 1 | HCHO | 7.8 | 20.4 | 7.5 | 16.6 |
| | 2 | $CH_3(CH_2)_2CHO$ | 7.6 | 22.5 | 7.6 | 15.5 |
| | 3 | Nonaddition | 9.8 | — | 9.0 | — |

TABLE 2

|   |   |   | 75° C. | | 130° C. | |
|---|---|---|---|---|---|---|
|   | No. | Concretion preventing agent | Breaking strength (Kg/cm$^2$) | Concretion preventing rate (%) | Breaking strength (Kg/cm$^2$) | Concretion preventing rate (%) |
| Agent of the invention | 1 | $CH_3(CH_2)_3CHO$ | 4.0 | 62.9 | 3.2 | 65.2 |
|  | 2 | $CH_3(CH_2)_6CHO$ | 1.5 | 86.1 | 1.5 | 83.6 |
|  | 3 | $CH_3(CH_2)_8CHO$ | 1.0 | 90.7 | 0.8 | 91.3 |
|  | 4 | $CH_3(CH_2)_4CH(CH_2)_2CHO$ <br>                          OH | 1.0 | 90.7 | 0.8 | 91.3 |
|  | 5 | $CH_3(CH_2)_{14}CHO$ | 0.8 | 92.5 | 0.5 | 94.5 |
|  | 6 | $CH_3(CH_2)_2CH=CH(CH_2)_{10}CHO$ | 0.8 | 92.5 | 0.5 | 94.5 |
|  | 7 | $CH_3(CH_2)_4CH-(CH_2)_3-CH-(CH_2)_5CHO$ <br>              OH                OH | 0.5 | 95.3 | 0.5 | 94.5 |
|  | 8 | $CH_3-CH-(CH_2)_8CHO$ <br>         $(CH_2)_4$ <br>         $CH_3$ | 0.5 | 95.3 | 0.5 | 94.5 |
|  | 9 | $CH_3-CH-(CH_2)_4-CH-(CH_2)_2-CHO$ <br>      $CH_3$        $(CH_2)_6$ <br>                        $CH_3$ | 0.5 | 95.3 | 0.4 | 95.6 |
| Comparative agent | 1 | HCHO | 7.9 | 26.8 | 7.6 | 17.3 |
|  | 2 | $CH_3(CH_2)_2CHO$ | 7.9 | 26.8 | 7.4 | 19.5 |
|  | 3 | Nonaddition | 10.8 | — | 9.2 | — |

TABLE 3

|   | No. | Concretion preventing agent | Breaking strength (Kg/cm$^2$) | Concretion preventing rate (%) |
|---|---|---|---|---|
| Agent of the invention | 1 | $CH_3(CH_2)_3CHO$ | 2.2 | 64.5 |
|  | 2 | $CH_3(CH_2)_6CHO$ | 2.0 | 67.7 |
|  | 3 | $CH_3(CH_2)_8CHO$ | 1.8 | 70.9 |
|  | 4 | $CH_3(CH_2)_4CH(CH_2)_2CHO$ <br>                OH | 1.8 | 70.9 |
|  | 5 | $CH_3(CH_2)_{14}CHO$ | 0.9 | 85.4 |
|  | 6 | $CH_3(CH_2)_2CH=CH(CH_2)_{10}CHO$ | 0.8 | 87.0 |
|  | 7 | $CH_3(CH_2)_4CH-(CH_2)_3-CH-(CH_2)_5CHO$ <br>              OH                OH | 0.5 | 91.9 |
|  | 8 | $CH_3-CH-(CH_2)_8CHO$ <br>         $(CH_2)_4$ <br>         $CH_3$ | 0.6 | 90.3 |
|  | 9 | $CH_3-CH-(CH_2)_4-CH-(CH_2)_2-CHO$ <br>      $CH_3$        $(CH_2)_6$ <br>                        $CH_3$ | 0.5 | 91.9 |
| Comparative agent | 1 | HCHO | 5.7 | 8.0 |
|  | 2 | $CH_3(CH_2)_2CHO$ | 5.5 | 11.3 |
|  | 3 | Nonaddition | 4.2 | — |

The embodiments of the invention in which an exclusive property or privilege is claimed are defined as follows:

1. A method for preventing a fertilizer from concretion comprising mixing said fertilizer with from about 0.005 to 1.0 percent by weight, based on the weight of the fertilizer, of a compound of the formula:

$$R-CHO \qquad (1)$$

in which R is an alkyl, an alkenyl, a hydroxyalkyl or a hydroxyalkenyl, having 4 to 30 carbon atoms and being either straight chained or branched.

2. A method as claimed in claim 1, in which R has 7 to 30 carbon atoms.

3. A method as claimed in claim 1, in which the compound is selected from the group consisting of octanal, nonanal, 4-hydroxy nonanal, decanal, undecanal, dodecanal, tridecanal, tetradecanal, pentadecanal, hexadecanal, hexadecenal, 7,11-dihydroxy hexadecanal, isohexadecanal and octadecanal.

4. A fertilizer composition which comprises a fertilizer and 0.005 to 1.0 percent by weight, based on the weight of said fertilizer, of a compound of the formula:

$$R-CHO \tag{1}$$

in which R is an alkyl, an alkenyl, a hydroxyalkyl or a hydroxyalkenyl, having 4 to 30 carbon atoms and being either straight chained or branched.

5. A fertilizer composition which comprises a fertilizer and 0.005 to 1.0 percent by weight of the compound selected from the group consisting of octanal, nonanal, 4-hydroxy nonanal, decanal, undecanal, dodecanal, tridecanal, tetradecanal, pentadecanal, hexadecanal, hexadecenal, 7,11-dihydroxy hexadecanal, isohexadecanal and octadecanal.

* * * * *